United States Patent
Witzel et al.

(10) Patent No.: US 8,111,264 B2
(45) Date of Patent: Feb. 7, 2012

(54) METHOD OF AND SYSTEM FOR NON-UNIFORM IMAGE ENHANCEMENT

(75) Inventors: Mark Witzel, Brooklin (CA); Mark Grossman, Palo Alto, CA (US)

(73) Assignee: ATI Technologies ULC, Markham, Ontario (CA)

( * ) Notice: Subject to any disclaimer, the term of this patent is extended or adjusted under 35 U.S.C. 154(b) by 405 days.

(21) Appl. No.: 11/394,991

(22) Filed: Mar. 30, 2006

(65) Prior Publication Data

US 2007/0229503 A1  Oct. 4, 2007

(51) Int. Cl.
 G09G 5/00  (2006.01)
 G06K 9/40  (2006.01)
(52) U.S. Cl. .................................. 345/611; 382/269
(58) Field of Classification Search .................. 345/611; 382/269
 See application file for complete search history.

(56) References Cited

U.S. PATENT DOCUMENTS

| | | | | |
|---|---|---|---|---|
| 5,230,039 A | | 7/1993 | Grossman et al. | 395/130 |
| 5,264,838 A | * | 11/1993 | Johnson et al. | 345/611 |
| 5,307,450 A | | 4/1994 | Grossman | 395/123 |
| 5,544,294 A | * | 8/1996 | Cho et al. | 345/441 |
| 5,651,104 A | * | 7/1997 | Cosman | 345/428 |
| 5,877,771 A | * | 3/1999 | Drebin et al. | 345/586 |
| 6,128,000 A | * | 10/2000 | Jouppi et al. | 345/614 |
| 6,246,415 B1 | | 6/2001 | Grossman et al. | 345/422 |
| 6,339,432 B1 | | 1/2002 | Grossman | 345/639 |
| 6,344,852 B1 | * | 2/2002 | Zhu et al. | 345/418 |
| 6,369,828 B1 | * | 4/2002 | Lewis | 345/611 |
| 6,532,018 B1 | | 3/2003 | Chen et al. | 345/519 |
| 6,650,323 B2 | * | 11/2003 | Naegle et al. | 345/419 |
| 6,697,063 B1 | * | 2/2004 | Zhu | 345/421 |
| 6,756,978 B1 | | 6/2004 | Chen et al. | 345/419 |
| 6,760,025 B1 | * | 7/2004 | Hung et al. | 345/422 |
| 6,760,033 B2 | | 7/2004 | Chen et al. | 345/519 |
| 6,829,391 B2 | * | 12/2004 | Comaniciu et al. | 382/243 |
| 6,879,948 B1 | | 4/2005 | Chalfin et al. | 703/14 |
| 6,906,729 B1 | * | 6/2005 | Sanz-Pastor et al. | 345/611 |
| 6,943,805 B2 | * | 9/2005 | Snyder et al. | 345/589 |
| 6,982,717 B2 | * | 1/2006 | Sakagami et al. | 345/473 |
| 7,002,597 B2 | * | 2/2006 | Arnold et al. | 345/615 |
| 7,015,920 B2 | * | 3/2006 | Ono | 345/545 |
| 7,081,902 B1 | * | 7/2006 | Crow et al. | 345/611 |
| 7,095,421 B2 | * | 8/2006 | Vijayakumar et al. | 345/613 |
| 7,173,631 B2 | * | 2/2007 | Anderson | 345/611 |
| 7,298,375 B1 | | 11/2007 | Hutchins | 345/561 |
| 7,369,140 B1 | * | 5/2008 | King et al. | 345/611 |
| 7,456,846 B1 | * | 11/2008 | King et al. | 345/613 |
| 7,656,416 B2 | * | 2/2010 | Demers et al. | 345/611 |

(Continued)

OTHER PUBLICATIONS

Orenstein (QuickStudy: Application Programming Interface (API) (Computerworld, Jan. 10, 2000).*

(Continued)

*Primary Examiner* — Daniel Washburn
(74) *Attorney, Agent, or Firm* — Baker & Daniels LLP

(57) ABSTRACT

Methods of rendering a view of a scene include steps that specify quality levels of anti-aliasing and texture filtering for predetermined regions of a display, or selected objects within the scene, or both. Methods of processing data for display include steps adapted to process portions of the image according to selected or predetermined anti-aliasing and texture filtering quality levels. Graphics processing equipment includes hardware or software adapted to perform non-uniform anti-aliasing of images according to specified criteria.

19 Claims, 10 Drawing Sheets

U.S. PATENT DOCUMENTS

| | | | |
|---|---|---|---|
| 2001/0028352 A1* | 10/2001 | Naegle et al. | 345/501 |
| 2001/0033287 A1* | 10/2001 | Naegle et al. | 345/601 |
| 2003/0043169 A1* | 3/2003 | Hunter | 345/611 |
| 2003/0132944 A1* | 7/2003 | Smith | 345/581 |
| 2004/0100474 A1* | 5/2004 | Demers et al. | 345/582 |
| 2005/0083348 A1* | 4/2005 | Brown et al. | 345/613 |
| 2005/0179698 A1* | 8/2005 | Vijayakumar et al. | 345/611 |
| 2006/0053189 A1 | 3/2006 | Mantor | 708/490 |
| 2006/0152519 A1 | 7/2006 | Hutchins et al. | 345/561 |
| 2006/0250414 A1* | 11/2006 | Golovin | 345/611 |

OTHER PUBLICATIONS

Akenine-Möller, Tomas et al., *"Real-Time Rendering"*, Second Edition, A K Peters, Ltd., 2002, pp. 84-101, 129-141, and vii-x.

Case, Loyd, "ATI's Crossfire Secret Sauce" ExtremeTech Website, http://www.extremetech.com/print_article2/0,1217,a=153353,00.asp. Jun. 2, 2005.

Cross, Jason, "Transparency Adaptive AA: A Closer Look," ExtremeTech, http://www.extremetech.com/print_article2/0,1217,a=155885,00.asp, pp. 1 of 3, Jul. 13, 2005.

M. Doggett and et al., "Adaptive view dependent tessellation of displacement maps," pp. 1 of 18, Aug. 2000.

T. A. Funkhouser et al.,. "Adaptive Display Algorithm for Interactive Frame Rates During Visualization of Complex Virtual Environments," 8 pages, Sep. 1993.

Matrox Parhelia™., "16x Fragment Antialiasing," May 14, 2002, 9 pages.

nVidia, "Technical Brief: CineFX 4.0: Unimaginable Speeds for Advanced Visual Effects," TB-01857-001_v01, May 16, 2005, 16 pages.

M. Woo et al. *"The Official Guide to Learning OpenGL, Version 1.2:* Third Edition," Addison-Wesley, 29 pages, Aug. 1999.

Segal, Mark et al., *The OpenGL® Graphics System: A Specification* (Version 2.0—Oct. 22, 2004), Silicon Graphics, Inc., 1992-2004, 18 pages.

Wang, Lifeng et al., "View-Dependent Displacement Mapping," 14 pages, Jul. 2003.

* cited by examiner

300

300'

310

```
┌─────────────────────────────────────────────────────────────┐
│ Rendering a First Portion of the View Corresponding to a    │
│ Selected Object to a First Corresponding Portion of a       │─ 312
│ Display with a First Quality Level of Anti-Aliasing Based on a│
│ Quality Metric of the Selected Object; and                  │
└─────────────────────────────────────────────────────────────┘
                              │
                              ▼
┌─────────────────────────────────────────────────────────────┐
│ Rendering a Second Portion of the View not Corresponding to the│
│ Selected Object to Second Corresponding Portion of the      │─ 314
│ Display with a Second Quality level of Anti-Aliasing        │
└─────────────────────────────────────────────────────────────┘
```

Fig. 3C

| Tile | Quality Capability |
|---|---|
| 0 | 0 |
| 1 | 1 |
| 2 | 2 |
| 3 | 2 |
| 4 | 0 |
| 5 | 1 |
| 6 | 2 |
| 7 | 2 |
| 8 | 0 |
| 9 | 1 |
| 10 | 1 |
| 11 | 1 |
| 12 | 0 |
| 13 | 0 |
| 14 | 0 |
| 15 | 0 |

Fig. 4C

METHOD OF AND SYSTEM FOR NON-UNIFORM IMAGE ENHANCEMENT

FIELD OF THE INVENTION

The present invention relates to methods and apparatus that enhance images in a computer display system with reduced hardware load. In particular, the invention presents a method and apparatus for anti-aliasing selected portions of displayed images in a non-uniform manner.

BACKGROUND OF THE INVENTION

Computer graphics finds uses in many applications, including business, science, animation, simulation, computer-aided design, process control, electronic publication, gaming, and medical diagnosis. To display a realistic representation of a scene comprising multiple arbitrary shapes, a computer graphics system uses a rendering pipeline, as shown in FIG. 2A. The system models the arbitrary shapes, usually in the application stage 210 or the geometry stage 220, by combining multiple polygons. The rasterizer stage 230 takes polygon and space coordinate data and translates it to a view of the scene, in a format suitable for the physical display system 240. Increasing the realism of displayed views is an essential mission of computer graphics.

A serious challenge to rendering realistic views arises from attempting to display mathematically smooth curves or textures on a physical display comprising a plurality of picture elements, known as "pixels." Within a computer program, a polygon represented by a series of mathematical functions effectively has infinite resolution subject only to the limitation of mathematics while even the highest resolution physical display systems have finite resolution. The display must represent every polygon in the view by selecting a color value and other characteristics for each pixel. Since a pixel can only be rendered with one color at a time, when the pixel is on a boundary between polygons of differing colors, a jagged color transition can occur if the system does not carefully choose the color of the pixel. This effect, known as aliasing, is most commonly seen when a system chooses pixel color based on a single sample point within the area of the view covered by the pixel. Aliasing artifacts can also occur within textures as they are applied over polygons. Of course, as the resolution of a display increases, the visibility of aliasing artifacts can decrease.

In an effort to minimize aliasing, a variety of techniques that essentially create the illusion that the display has higher resolution than it physically does have been developed. These anti-aliasing techniques include those that primarily correct aliasing of polygon edges, e.g. A-buffer, fragment-based techniques, and other shared storage techniques, and those that correct aliasing of textures, e.g. mipmapping, ripmapping, summed area table and other filtering techniques.

Though aliasing, essentially being limited to edges of polygons and abrupt color transitions within textures, occurs only over a very small area of the screen, in a dynamic image this area is in constant flux. Because tracking the regions that need anti-aliasing is often more difficult, and expensive, than performing anti-aliasing over the entire view, many graphics technologies currently process the entire view to make the edges appear smoother. These techniques are known as full-scene anti-aliasing (FSAA).

One variety of FSAA prescribes sampling object characteristics at multiple points dispersed throughout the theoretical pixel. Each of the characteristics is then given a final value, a function of the multiple values sampled at each point, which is rendered for display. This technique is known as multisample anti-aliasing (MSAA), often preceded by a multiplier indicating the number of samples used per pixel, e.g. 4× MSAA for multi-sampling using four samples per pixel.

Another variety of FSAA prescribes rendering the entirety of the view at a higher resolution, usually having a number of virtual pixels that is a multiple of the actual number of pixels in the display so that each physical pixel has a natural number of corresponding virtual pixels. Each characteristic of a physical pixel is a function of the corresponding characteristics of the corresponding virtual pixels. This technique is known as supersampling, often preceded by a multiplier indicating the number of virtual pixels rendered for every physical pixel, e.g. 4× supersampling for a virtual view rendered at four times the resolution. Because rendering a pixel requires more resources than simply sampling it, supersampling is more computationally demanding than MSAA.

These FSAA techniques are generally effective, but computationally intensive, and can only be implemented at high quality levels beyond 4× by very high end systems. Other techniques have attempted to achieve a net gain by substituting some full-scene computations with computations for determining which pixels are partially covered and require anti-aliasing, and to use higher quality anti-aliasing on those pixels. In one scheme, the pixels that are partially covered by one or more polygons are identified and then stored in a separate buffer. The characteristics of the various polygons competing for these pixels are filtered to arrive at a final value for the pixels. This has been termed "fragment" anti-aliasing (FAA), but this use of "fragment" denotes a partially covered pixel, a sense that differs from that used in the rest of this application, and in the art in general.

Further, because traditional FSAA fails to correct some anti-aliasing within textures, a texture filtering technique is usually applied to a view to reduce aliasing within textures applied to the polygons that compose the view. These techniques also act to reduce the blurring associated with magnification and minification of textures during application to a polygon.

However, at least one technique attempts to increase the effect of anti-aliasing on textures. In this scheme, anti-aliasing is applied to textures that are mapped onto the surface of a polygon and that have some level of transparency, a characteristic specified in a portion of the texture called the alpha channel. Textures with transparency are anti-aliased, using a scheme similar to either supersampling or MSAA. This is known as transparency adaptive anti-aliasing (TAAA). While TAAA has no efficiency advantages over traditional FSAA, is does permit increased realism in texture rendering.

However, all known anti-aliasing techniques, including texture filtering techniques, fail to provide efficient, high-quality anti-aliasing of the visually or programmatically important elements of a scene, without spending additional computing power to enhance unimportant or less important elements.

BRIEF SUMMARY OF THE INVENTION

The disclosure presents several embodiments of the present invention, including methods related to rendering and displaying images, which can be implemented in software, hardware or some combination. In one embodiment, the present invention includes a method of rendering a view of a scene with different levels of anti-aliasing in different regions of the view. The method comprises the steps of rendering a first portion of the view to a corresponding portion of a display with a first quality level of anti-aliasing, and rendering a second portion of the view to a corresponding portion of the display with a second quality level of anti-aliasing, wherein the second quality level is lower than the first quality level. Preferably, the view is then displayed on the display.

In another embodiment, a quality metric corresponding to a preferred quality level is specified for one or more objects, in a method of displaying a view of a scene that includes a plurality of objects. This method comprises the steps of: using a first quality level of anti-aliasing based on a quality metric of a selected object within a first portion of a view to display the object to a first corresponding portion of the display; and displaying a second portion of the view in a second corresponding portion of a display with a second quality level of anti-aliasing, and displaying a third portion of the view in a third predetermined portion of the display with a third quality level of anti-aliasing. Preferably, the third quality level is lower than the first quality level and lower than the second quality level.

In still another embodiment, anti-aliasing quality levels are specified only for objects. A method of displaying a view of a scene that includes a plurality of objects comprises the steps of: displaying a selected object with a first quality level of anti-aliasing; and displaying the remaining objects with a second quality level of anti-aliasing, wherein the second quality level is lower than the first quality level.

The present invention also includes embodiments specifying processing steps to display scenes with non-uniform enhancement. For example, a method of displaying a view of a scene comprises the steps of: processing the view to have a first quality level; determining a first portion of the view; performing anti-aliasing on at least the first portion of the view so that the first portion of the view has a second quality level that is greater than the first quality level; and displaying the view on a display.

In another embodiment, a more detailed method of processing data that includes a plurality of primitives for display is presented. This method comprises the steps of: determining an object quality metric for a primitive; converting the primitive into at least one fragment and associating each fragment with a pixel and an associated tile region of a display; determining a tile quality level for the associated tile region from the object quality metric and a tile quality capability table; and performing a first anti-aliasing operation on the fragment, wherein the first anti-aliasing operation has a quality level based on the tile quality level of the associated tile region.

Yet another embodiment of the present invention includes a method for dynamically displaying a changing scene on a display comprising a plurality of regions. This method comprises the steps of: assigning a first subgroup of regions a first quality capability; assigning a second subgroup of regions a second quality capability; assigning an object quality metric to an object of the scene; and performing a display operation. The display operation includes the steps of: associating the object with one or more subgroups of regions; assigning a first quality level to any object-associated region within the first subgroup, wherein the first quality level depends on the object quality metric and the first quality capability; and performing a first anti-aliasing operation in every region with the first quality level. The display operation preferably includes the further steps of assigning a second quality level to any object-associated region within the second subgroup, wherein the second quality level depends on the object quality metric and the second quality capability, performing a second anti-aliasing operation in every region with the second quality level; and displaying the scene. The regions can comprise sub-regions, which can be displayed independently with differing levels of anti-aliasing quality.

Typically, everything within an object-associated region assigned a quality level for a frame is displayed with its assigned quality level during the frame in which that quality level is displayed. Preferably, quality levels are recalculated for each frame. Though the assigned quality levels preferably depend on the quality metric and quality capability, some embodiments relax this dependency to allow for temporal dithering.

The disclosure also relates to systems and devices for processing and displaying images, for example, a system for processing data that includes a plurality of primitives for display. In one embodiment a system comprises a primitive processor configured to receive a primitive and associate it with an object quality metric; a scan converter configured to receive the primitive and the object quality metric from the primitive processor, to convert the primitive into at least one fragment, and to associate a first fragment with a first pixel and a first tile region; a tile quality capability processor configured to receive the object quality metric and a first tile parameter representing the first tile region from the scan converter, and to determine a first tile quality level for the first tile region based on a tile quality capability of the first tile and on the object quality metric; and a fragment processor configured to receive the first fragment from the scan converter and to receive the first tile quality level from the tile quality processor, and to perform a first anti-aliasing operation on the fragment, wherein the first anti-aliasing operation has a quality level based on the first tile quality level.

In another embodiment, the present invention relates to a graphics processing unit, comprising: a host interface configured to receive data from a host device; a geometry device configured to receive data from the host interface, to use the data to form a plurality primitives, and to assign a quality metric to each primitive; a rasterizer device configured to receive a first primitive from the geometry device, to generate at least one fragment, comprising a plurality of pixels, based on the first primitive, to assign each fragment a fragment quality level based at least in part on the quality metric of the first primitive, and to perform a first anti-aliasing operation on each fragment, wherein the first anti-aliasing operation has a quality level based on the fragment quality level; a frame buffer device configured to assist the rasterizer device in performing anti-aliasing operations; and a display interface configured to receive the pixels of each fragment from the rasterizer device and to send the pixels to a display.

Though the quality level of anti-aliasing is based on the fragment quality level, the dependence need not be of any particular form. Preferably, the dependence is implemented as a series of thresholds.

BRIEF DESCRIPTION OF THE FIGURES

FIG. 3C is a block diagram of a method of displaying a view including objects in accordance with one embodiment of the present invention.

FIG. 4C is a schematic diagram of a quality level table in accordance with one embodiment of the present invention.

DETAILED DESCRIPTION OF SEVERAL EMBODIMENTS OF THE PRESENT INVENTION

Figure 1:
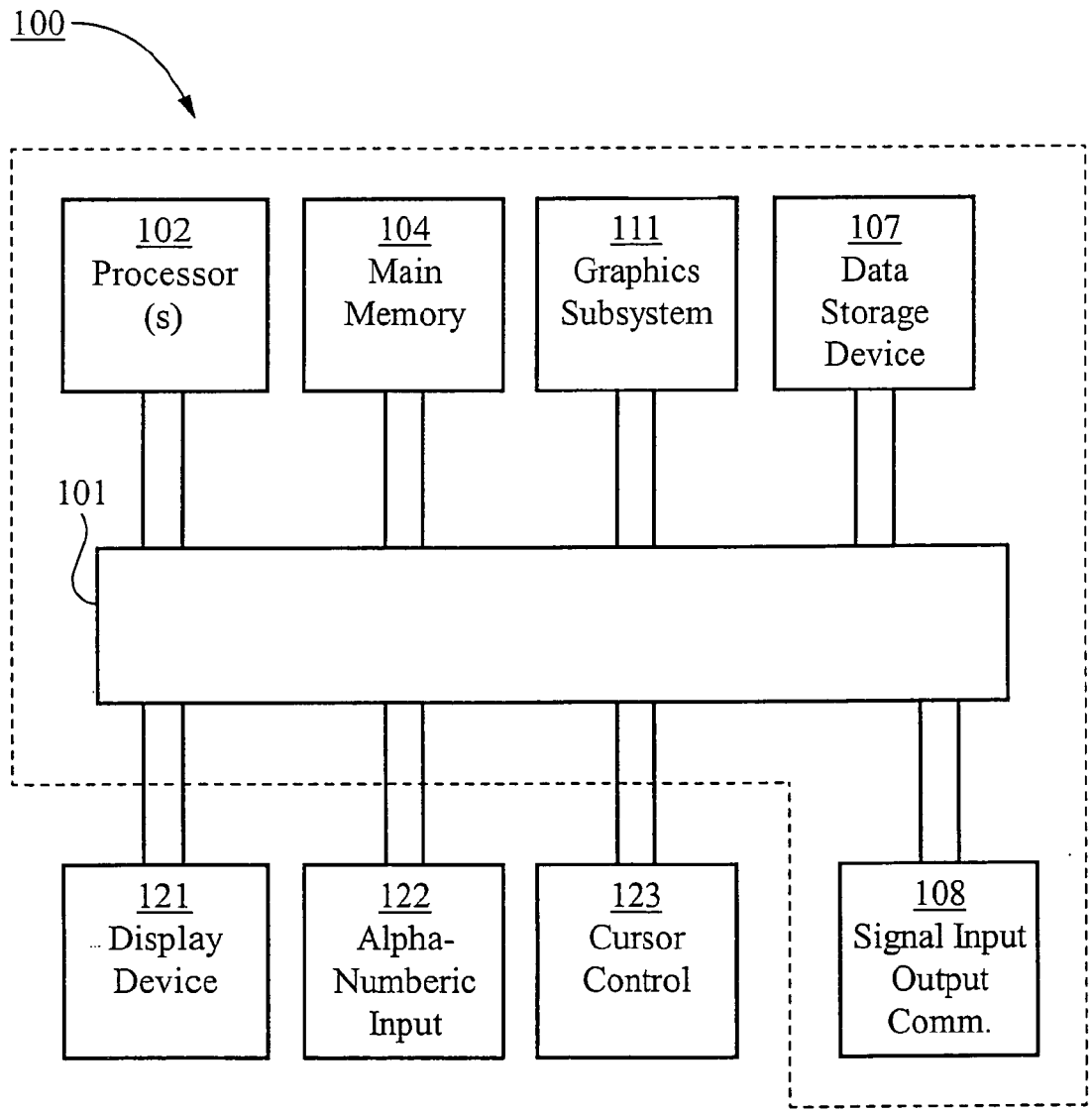
FIG. 1 is a block diagram of a computer system; the present invention prescribes incorporating novel algorithms into one or more components of a computer system.

The following section includes descriptions of several embodiments of the present invention, and makes reference to the figures. The specific configurations discussed are only examples, and do not serve to limit the scope of the invention. A person having ordinary skill in the relevant art will understand that the present invention can be practiced by using other configurations and arrangements of the illustrated embodiments, or by using equivalent applications or devices that are not illustrated or even mentioned.

Terminology

The terms defined below appear frequently throughout this application:

"anti-aliasing" refers to techniques for reducing aliasing artifacts, both in polygon and line edges, e.g. multi-sampling, A-buffering, area sampling, point sampling, sub-pixel rendering, and over-sampling, as well as textures, e.g. mipmapping, ripmapping, summed area table filtering, and unconstrained anisotropic filtering, and any other techniques whereby multiple points, fragments, and/or samples are considered when processing a pixel or fragment;

"computer usable storage medium" refers to media capable of storing software or instructions usable by a computer system;

"display" in noun form refers to hardware comprising a plurality of physical pixels and capable of displaying rasterized images, in verb form it refers to depicting an image (such as a view), typically on a monitor or other display;

"fragment" refers to data describing properties of an associated pixel that is covered by a primitive;

"frame buffer" refers generally to all buffer memories within a graphics system, which could include single and multiple buffering schemes;

"model" and "object" each refer to a collection of geometric entities;

"null anti-aliasing operation" refers to the lack of an anti-aliasing operation, where no resources are used or allocated to perform anti-aliasing;

"pixel" is short for picture element, and refers to the smallest element capable of expressing a complete color palette, both of a physical display and of an image represented in memory;

"primitive" refers to the smallest geometric entities of which a model is constructed in a graphics system, they are typically triangles, but could include points, lines or other geometric figures;

"quality level" refers to the realism of an image, with higher quality levels being more realistic, and also refers to the capability of an anti-aliasing technique to produce a realistic image, with higher quality levels being capable of producing more realistic images;

"quality metric" refers to a preference associated with an object for a quality level upon display;

"quality capability" refers to a potential for quality of a region of a display;

"rasterizer" and "scan converter" are used interchangeably, as are their associated verbs, and are used to refer to devices that can accomplish a process of converting an image or image components to pixels or fragments;

"rendering" refers to a process of performing computational hardware and software operations to prepare an image, e.g. a view, for display;

"scene" refers to a collection of models, defining the entirety of a rendered environment, as well as lighting, material, and viewing specifications;

"sub-pixel" refers to a constituent element of a pixel that handles only a single color channel;

"tile" refers to a rectangular set of pixels, which may be part of a quality region;

"view" refers to a virtual depiction of a scene from some aspect.

Conceptual Environment

Figure 2A:
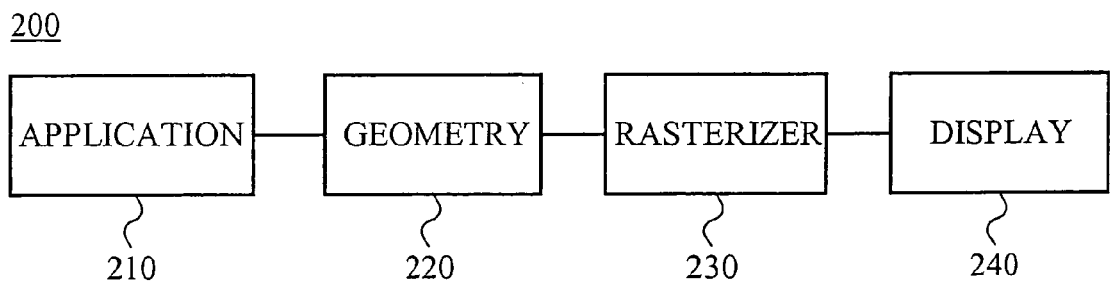
FIG. 2A is a block diagram of a rendering pipeline known in the art.
Figure 2B:
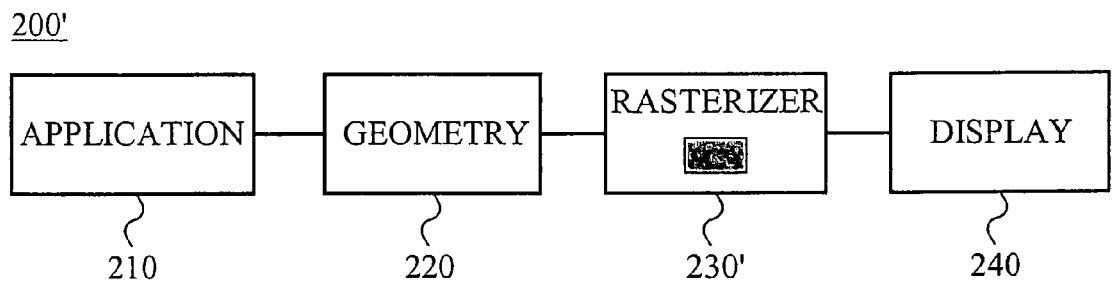
FIG. 2B is a block diagram of a rendering pipeline incorporating novel algorithms in accordance with the present invention.

The present invention can be implemented using hardware, software, or some combination thereof, in a computer system or another processing system. The rendering pipeline 200' of FIG. 2B shows the conceptual stages of a graphics display system incorporating an embodiment of the present invention. These are application 210, geometry 220, rasterizer 230', and display 240. The various stages of the rendering pipeline 200' can involve both software and hardware resources. In general, the role of hardware increases, and that of software decreases, as a rendering operation progresses from the application stage 210 to the display stage 240.

In the geometry stage 220, graphical data generated during the application stage 210 is converted into primitives correlated with a screen coordinate system. Then, in the rasterizer stage 230', fragments based on the primitives are generated and various image quality improvements (e.g., z-buffering, blending, texturing, and anti-aliasing) are performed in accordance with the present invention. The resulting pixel values are typically stored in a frame buffer memory. During the display stage 240, the pixel values are displayed as an image on one or more display monitors.

Though the stages represented in the rendering pipeline 200' are typical, and some embodiments of the present invention are described with reference to a graphics system possessing each of these stages, the specifics of a graphics system depend on implementation and the present invention in no way relies on the presence of these conceptual stages within a graphics system for effectiveness. Instead, the present invention describes the systems and methods of displaying or processing data that can be implemented within a broad range of graphics systems.

Hardware Environment

FIG. 1 shows an exemplary computer system 100 in which the present invention can be implemented. The present invention can be implemented using hardware, software, or some combination thereof, in the computer system 100. The computer system 100 can include a graphics system that follows the conceptual stages described above with reference to FIG. 2.

The computer system 100 comprises a communications infrastructure 101, e.g. a bus, and at least one processor 102 coupled to the communications infrastructure 101. Certain portions of embodiments of the present invention can be implemented in software, which is substantially performed in the processor of a computer system.

The computer system 100 further comprises a main memory subsystem 104, which is preferably random access memory or another dynamic storage medium. Preferably, the computer system also includes a data storage device 107, which could include a hard disk drive, or a removable storage drive such as an optical disk drive, magnetic tape drive, cartridge drive (as used in video game devices), removable memory chip, or floppy disk drive. The data storage device 107 includes a computer-usable storage medium including computer software, information, and instructions. Main memory 104 also can be used for storing temporary variables or other intermediate information during execution of instructions by processor 102. Both main memory 104 and the data storage device 107 are coupled to the communications infrastructure 101.

The computer system 100 also preferably includes at least one signal input/output (I/O) device 108 capable of transferring software or information between the computer system 100 and external devices. Exemplary I/O devices include network interface cards (such as Ethernet cards, wide area network cards, local area network cards or wireless network cards), modems, communications ports (such as infrared ports and wireless ports), and PCMCIA slots. The I/O device 108 is coupled with the communications infrastructure 101 to permit communication with the rest of the computer system 100.

The computer system 100 uses computer programs or control logic stored in one or both of main memory 104 and the data storage device 107, after receiving them from either a removable storage medium or from the I/O device 108. In some embodiments of the present invention, portions of the invention are performed by executing a computer program.

The computer system 100 can also be coupled via a bus 101 to an alphanumeric input device 122, including alphanumeric and other keys, and is typically coupled to the communications infrastructure 101 for communicating information and command selections to the processor 102. Another type of user input device is cursor control 123, such as a mouse, a trackball, or cursor direction keys for communicating direction information and command selections to the processor 102 and for controlling cursor movement. This input device typically has two degrees of freedom in two axes, a first axis and a second axis, which allows the device to specify positions in a plane.

The computer system 100 can include a computer controlled graphics system for generating two-dimensional or three-dimensional images. A graphics subsystem 111, coupled to the communications infrastructure 101, provides dedicated graphics processing. The processor 102 provides the graphics subsystem 111 with graphics data such as drawing commands, coordinate vertex data, and other data related to a geometric position of an object, its color, or its surface parameters. Preferably, the object data is processed by the graphics subsystem 111 in the following pipelined stages: application, geometry, raster, and display, which were discussed in more detail with reference to FIG. 2B above. Following processing by the graphics subsystem 111, an image is displayed to the monitor or display device 121.

Though the computer system 100 is typical, and the some embodiments of the present invention are described with reference to this typical computer system, the present invention in no way requires the particular configuration of the computer system 100 for effectiveness. Instead, the present invention describes the systems and methods of displaying or processing data that can be implemented within a wide variety of computer and processing systems.

Method

Some embodiments of the present invention are methods of enhancing the visual realism and quality of displayed images more efficiently by selectively applying anti-aliasing to only certain areas of each image. The methods relate to both rendering and displaying a view, and to processing image data prior to display. Preferably, the areas of the image to which anti-aliasing (or high-quality anti-aliasing) are applied are those of greatest interest to the viewer of the image. The methods below generally relate to the rendering or processing of views or images prior to display. Typically these rendering or processing methods are implemented in software, hardware, or some combination. Following rendering and processing, an image need only be transmitted to an appropriate physical device, e.g. a monitor, in order to display it.

Figure 3A:
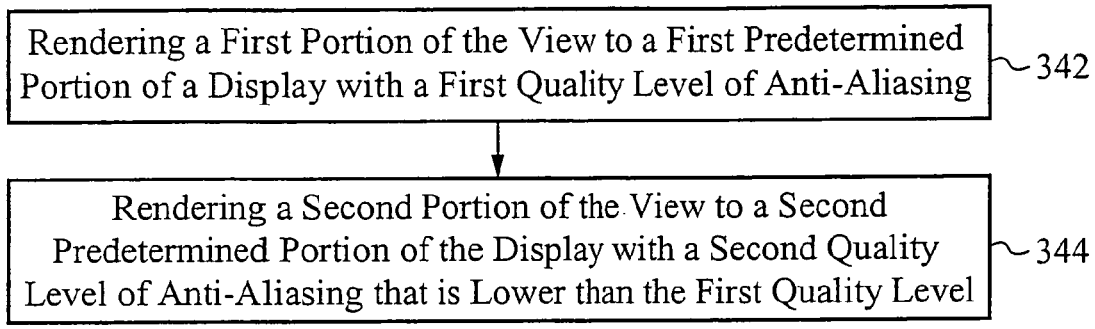
FIG. 3A is a block diagram of a method of displaying a view of a virtual scene in accordance with one embodiment of the present invention.

FIG. 3A illustrates a method 300 of rendering a view of a scene. Preferably, the scene includes a plurality of objects, some of which are low-interest and some high-interest. In one embodiment, the method 300 includes two steps. In one step 342, a first portion of the view is rendered to a first predetermined portion of a display with a first quality level of anti-aliasing. In another step 344, a second portion of the view is rendered to a second predetermined portion of the display with a second quality level of anti-aliasing that is lower than the first quality level. Preferably, the first predetermined portion is located in a region of the display that will contain the most interesting or meaningful images to a viewer so that those images will have the highest quality. Once the view is rendered, it can be transmitted to the display and viewed.

For example, in accordance with the present invention, multisample anti-aliasing is performed on a region of M×N tiles, with M representing an integer value less than or equal to the total rows of tiles in a display, and N representing an integer value less than or equal to the total columns of tiles in the display. The remainder of the display could be rendered in without anti-aliasing, or with a lower quality level of anti-aliasing.

In other embodiments, the entire view is processed to have a first quality level and then anti-aliasing is performed on one or more specified portions of the view so that they have a higher quality level.

Some other embodiments include multiple, discrete regions of a display that are anti-aliased at a higher quality level than the remainder of the display. Preferably, these regions are specified by an application programmer.

Figure 3B:
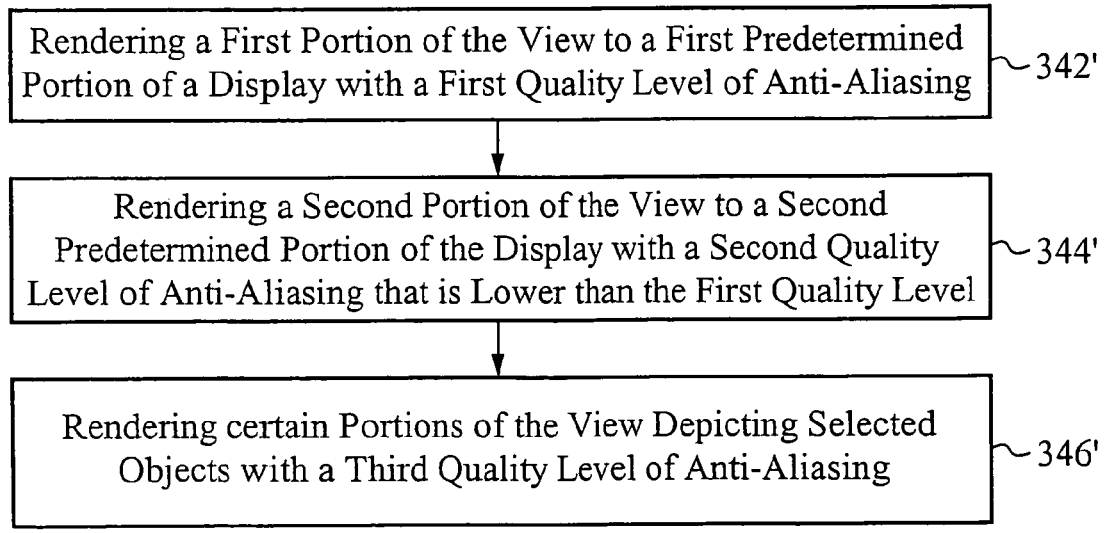
FIG. 3B is a block diagram of a method of displaying a view in accordance with one embodiment of the present invention.

FIG. 3B illustrates a method 300' that includes a step 342', in which a first portion of the view is rendered to a first predetermined portion of a display with a first quality level of anti-aliasing. In another step 344', a second portion of the view is rendered to a second predetermined portion of the display with a second quality level of anti-aliasing that is lower than the first quality level. In the step 346' certain portions of the view depicting selected portions of selected objects with a third quality level of anti-aliasing are rendered. The third quality level is preferably higher than the second quality level. The quality level of anti-aliasing used for the selected objects can be the same or different than the quality level used for the first portion of the display, but is always higher than the lower quality level used to display the second portion of the display. Following rendering, the view is displayed.

In still other embodiments, a method can include only a step similar to 346, where selected objects substantially within portions of the display capable of a first quality level are displayed with a second quality level, which has the first quality level as an upper bound and a step of displaying the remainder of the view at a quality level of anti-aliasing lower than the second quality level. For example, in some embodiments anti-aliasing is preformed at a high quality level on certain specified objects whenever those objects are within regions of the display capable of high quality level and at a lower quality level on the remainder of the display. Alternatively, anti-aliasing is performed at a high quality level for specified regions of the display regardless of which type of objects they depict, and at a lower quality level for the remainder of the display.

Preferably, these object-specific embodiments rely on similar structure underlying the region-specific embodiments described above with reference to FIG. 3A. A key difference is that in these embodiments, the positioning of the objects determines the quality level at which the regions displaying the objects are rendered. Hence, the quality levels of objects change, possibly along with each frame, as the objects move around the view. In particular, some embodiments include steps in which a group of regions of a scene corresponding to a selected object are determined and then displayed with a selected quality level of anti-aliasing.

An example of this type of method is the method 310 shown in FIG. 3C. The method 310 includes steps for rendering portions of a view of a scene that includes a plurality of objects. These steps include 312, rendering a first portion of the view corresponding to a selected object to a first corresponding portion of a display with a first quality level of anti-aliasing based on a quality metric of the selected object, and 314, rendering a second portion of the view not corresponding to the selected object to second corresponding portion of the display with a second quality level of anti-aliasing. Then the view is preferably displayed.

In some embodiments boundary regions of the objects are also displayed with selected anti-aliasing quality, permitting feathering of the object boundaries. The regions can vary in size from an entire display to a single pixel, permitting fine selection of the quality level at which objects are displayed. In these embodiments, the regions are presumed to have equal quality capabilities, permitting an object to move about the display freely and retain its assigned quality. Some other embodiments, discussed below, include regions of differing quality capability. The present invention seeks to permit the display of the most meaningful, important, and interesting portions of a view with higher quality than the remaining portions of the view. Since the important portions of a view displayed by a computer program using a graphics system can depend heavily on the specifics of the program, the present invention preferably provides an application programming interface through which an application programmer can specify which objects of a scene or regions of a display will receive high-quality anti-aliasing. In some embodiments, the quality levels can be varied to allow for dithering to avoid temporal artifacts.

The embodiments of the present invention also include methods that specify processing operations necessary to display non-uniformly enhanced images. Exemplary embodiments of these aspects of the invention are by necessity described with reference to certain architectures and conceptual representations of graphical image generation. However, these examples should not be construed to limit the claimed methods, as they could find implementation in a wide variety of architectures.

Figure 3D:
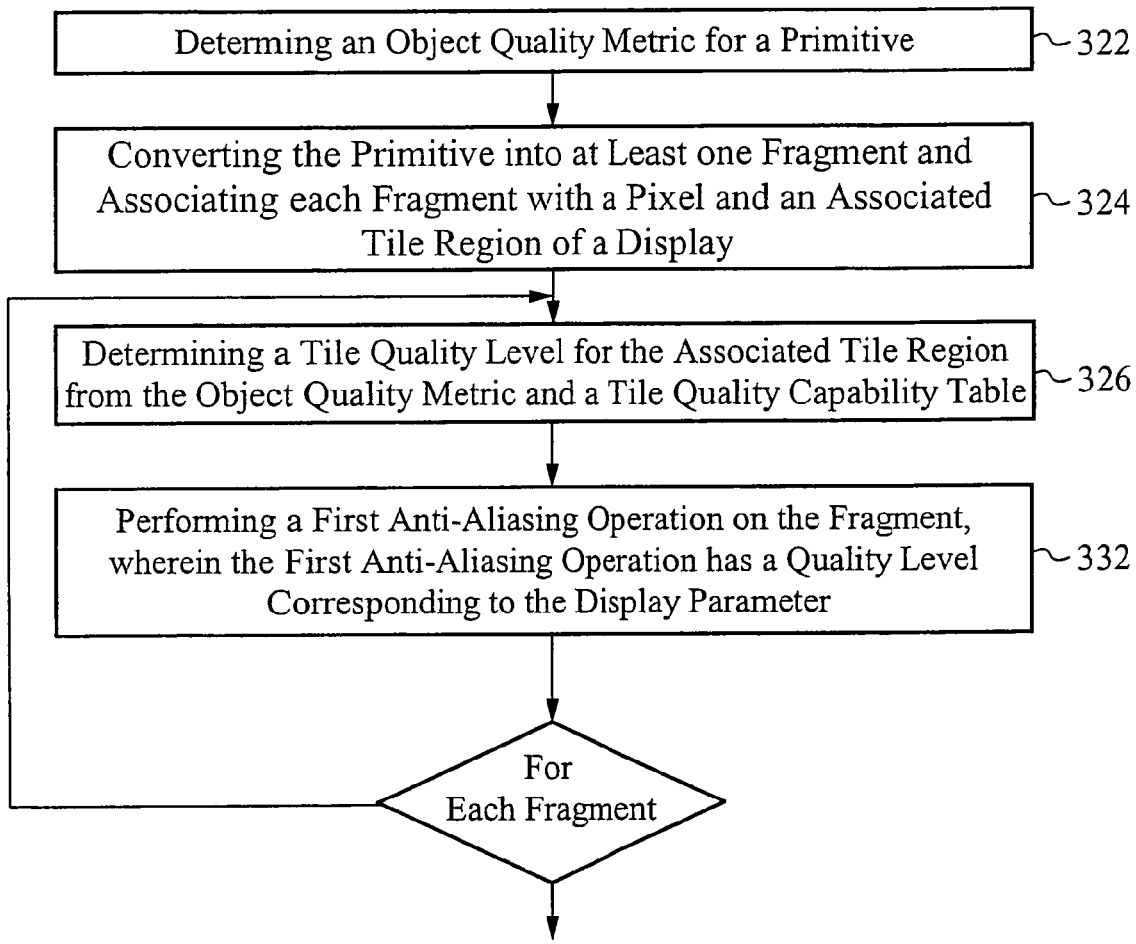
FIG. 3D is a block diagram of a method of processing data that includes primitives, in accordance with an embodiment of the present invention.

FIG. 3D depicts a method 320' of processing data that includes a plurality of primitives for display. The method 320' also includes several steps. In one step 322, an object quality metric is determined for a primitive. In another step 324, at least a portion of the primitive is associated with a pixel and an associated tile region of a display. In yet another step 326, a tile quality level is determined for the associated tile region from the object quality metric and a tile quality capability table. In a further step 332, a first anti-aliasing operation is performed on the fragment, wherein the first anti-aliasing operation has a quality level based on the first quality requirement. Further, the steps 326 and 332 are preferably repeated for each fragment originating from the primitive. In displaying a view of a scene in accordance with one embodiment of the present invention, this process is preferably used to process a great number of primitives that make up the entirety of the scene.

Boundary Conditions

The operation of the present invention to enhance various regions of a display with differing quality levels of anti-aliasing gives rise to boundaries between regions with different aliasing techniques or quality levels. Attention to these boundaries can avoid production of unwanted artifacts. Certain embodiments of the present invention contemplate including considerations to avoid such artifacts.

In some embodiments, the boundaries between regions of differing levels of anti-aliasing are feathered with an intermediate level of anti-aliasing to smooth the transition from high quality to low quality. The number of intermediate steps in this type of scheme can be large or small and fixed or adjustable. For example, a single intermediate level could be used, or a long series of intermediate levels could be used forming a somewhat smooth transition from high level anti-aliasing in one location of the display to low level in another.

In other embodiments, objects spanning boundaries between regions are tested to determine a single level of anti-aliasing to perform on the object. Exemplary methods include using a bounding box test to determine the size of the object and to determine a percentage of the object within each region, and determining the anti-aliasing level based on these two factors.

Also, in some embodiments, objects that could be antialiased at a certain quality level without using a selected amount of computing resources, e.g. memory, processing cycles, are always anti-aliased. Examples of this include small but important objects, e.g. aircraft to be identified, or larger objects that need only a relatively low level of antialiasing for noticeable improvement.

Dynamic Algorithms

In addition to boundary issues, those embodiments of the present invention that specify differing quality levels for objects can require dynamic algorithms to determine the appropriate anti-aliasing techniques to use as objects move in and out of regions, that themselves have differing anti-aliasing capabilities. The allocation of memory and assignment of quality levels to the regions is preferably done by software ahead of time. In alternative embodiments, these functions can be performed by hardware dynamically. In either case, some embodiments use a current quality level table to track the quality level of each region.

In some embodiments, every region of a display has a default quality level, and is anti-aliased according to that quality level unless an object with a higher quality metric intersects with the region and the region has a sufficiently high quality capability to render at the quality level indicated by the quality metric. For example, regions can all have a low, default quality level of anti-aliasing, or not be anti-aliased at all. Once an object with a higher assigned quality level does intersect, the format of pixels within the region is changed to conform to the higher quality filtering algorithm. The region is marked high-quality, and the new object and all subsequent objects within the region are rendered during the current frame with high-quality anti-aliasing. Preferably, quality levels are recalculated for each frame. Though the assigned quality levels preferably depend on the quality metric and quality capability, some embodiments relax this dependency to allow for temporal dithering.

Figure 3E:
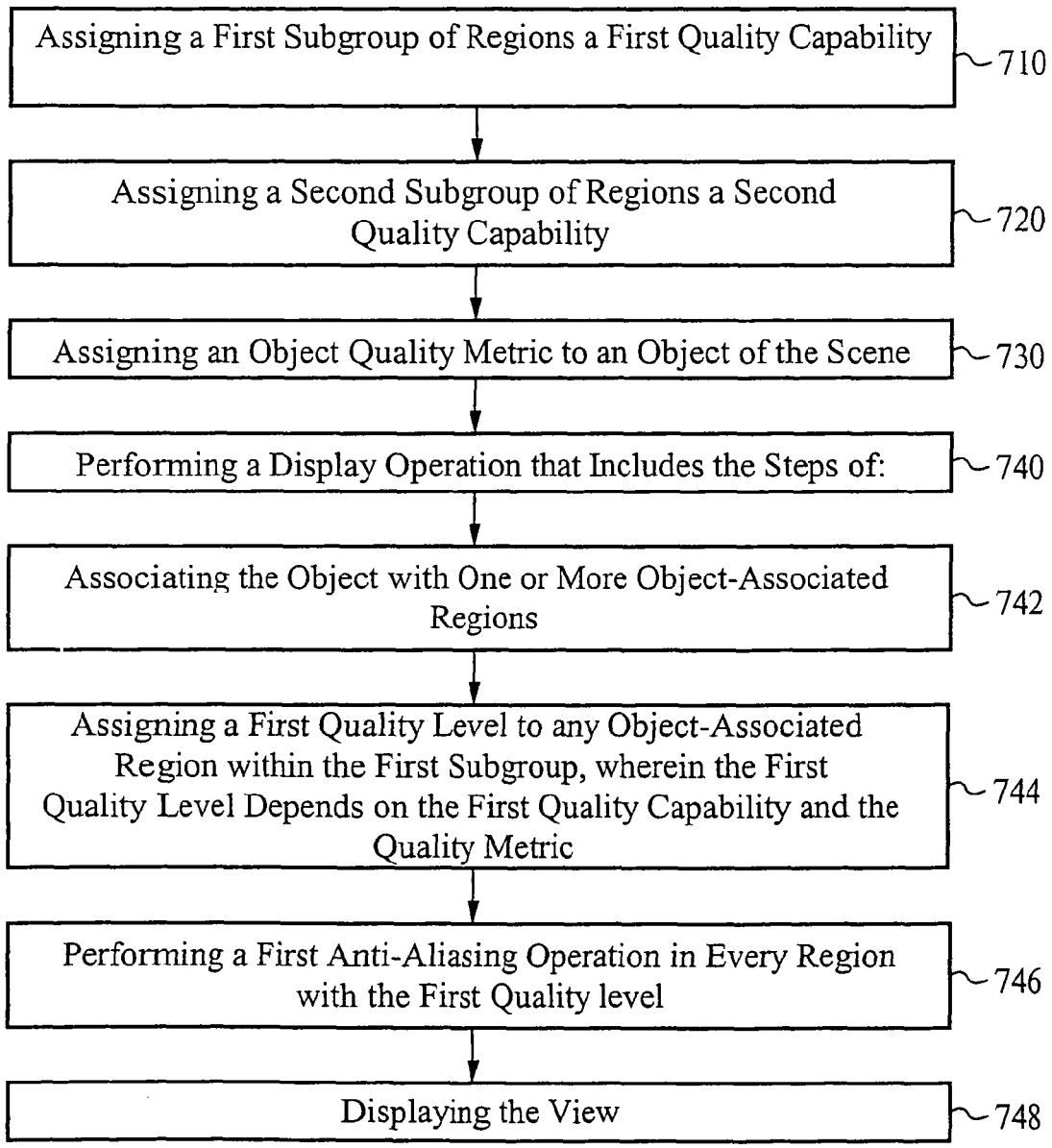
FIG. 3E is a block diagram of a method of displaying a changing scene on a display.

One embodiment of the present invention is the method of displaying a dynamic scene illustrated in FIG. 3E. First a view is divided into a group of regions; then, the method includes several preliminary steps. In one step 710, a first subgroup of regions is assigned a first quality capability. In another step 720, a second subgroup of regions is assigned a second quality capability. An object quality metric is assigned to an object of the scene in yet another step 730. Following the preliminary steps, in a step 740, a display operation is preferably repeated as the scene changes. The step 740 includes several substeps. In one substep 742, the object is associated with one or more object-associated regions. In another substep 744, a first quality level is assigned to any object-associated region within the first subgroup, wherein the first quality level depends on the first quality capability and the quality metric. In yet another substep 746, a first anti-aliasing operation is performed in every region with the first quality level. The view of the scene is displayed in substep 748. As the view or the scene changes, the object-associated regions can change, and hence, the anti-aliasing pattern on the final display can change as well.

In other embodiments, the display step can associate additional objects with additional subgroups and modify the subgroups assigned quality levels accordingly. For example, in some embodiments, the second subgroup is associated with another object of the scene having another quality metric. A second quality level dependent on the other quality metric and a quality capability of the second subgroup is then assigned to the second subgroup.

Various implementations of these steps are consistent with the present invention. For example, a current quality level table can be updated for tracking the quality level of each region (or subregion) during rendering of a frame.

System

Figure 4A:
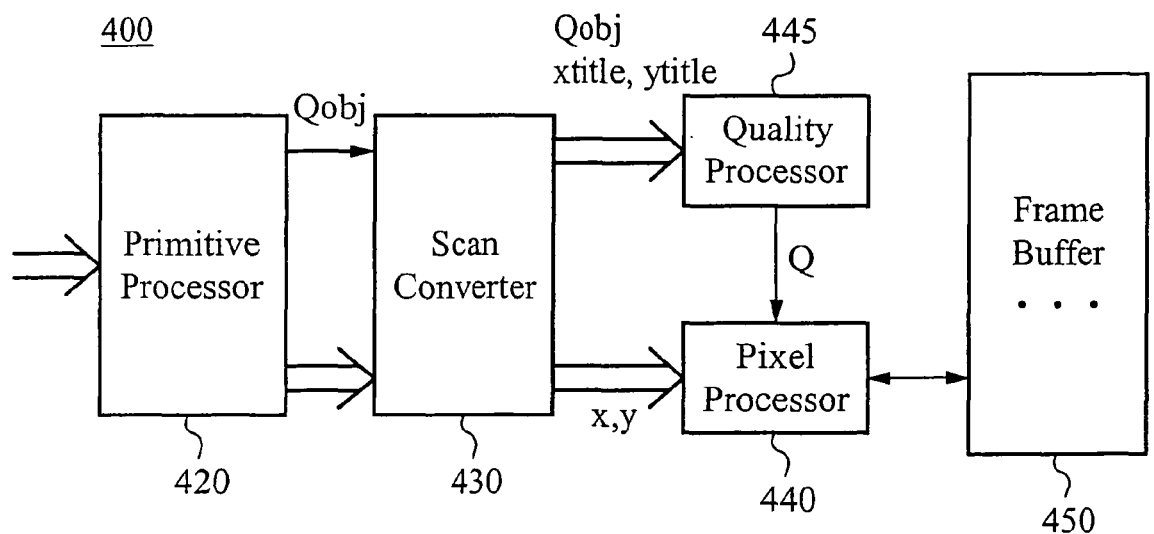
FIG. 4A is a block diagram of a system for processing data that includes primitives, in accordance with an embodiment of the present invention.

FIG. 4A illustrates a system 400 for processing data, including a plurality of primitives, for display. The system 400 includes a primitive processor 420 coupled with a scan converter 430, which is coupled with both a quality processor 445 and a pixel processor 440. The quality processor 445 is coupled with the pixel processor 440, which is coupled with a frame buffer 450.

Though the operation of the system 400 is discussed as a pipeline, the implementation of each stage can also include multiple parallel processor elements, along with appropriate sorting elements to ensure proper ordering of the processed data.

The primitive processor 420 receives a primitive and associates it with an object quality metric Qobj. During rendering of a view, this process is repeated many times for multiple primitives. In some embodiments of the present invention, the primitive processor 420 receives primitives from a hardware geometry engine; in other embodiments it receives primitives from a software application.

The scan converter 430 receives the primitive and the object quality level Qobj from the primitive processor 420, and associates the primitive with a pixel represented by the pixel parameter xy and an associated tile region represented by the tile parameter XY. Every pixel has an associated tile region, and the two form a pixel-tile-region pair. In many embodiments, each primitive is associated with multiple pixels to render a complete view of the primitive. Often, when a primitive has multiple associated pixels, these pixels extend across more than one tile region. In many cases, for each primitive, the scan converter 430 must perform multiple associations.

The scan converter 430 passes each pixel-tile-region pair to the next stage of the system 400, which includes both the quality processor 445 and the pixel processor 440. The system 400 processes each pixel-tile region pair, but can process many at one time. The preferred embodiments of the present invention include multiple parallelized pipelines within each element, particularly in the pixel processor 440 and quality processor 445 elements, though the following description of their operation describes the processing of only a single pixel-tile-region pair.

The quality processor 445 receives the object quality metric Qobj and the tile parameter XY from the scan converter 430, and determines a tile quality level Q for the tile region associated with the tile parameter XY. Preferably, this determination uses a tile quality capability table, which can be implemented as a lookup table (LUT), content addressable memory (CAM), or the like. The tile quality level Q depends on the specific tile quality capability associated with the tile parameter XY and on the object quality metric Qobj. In some embodiments, specific tiles have a predetermined minimum quality level, but their final tile quality level Q can rise above this quality level when rendering an object with a higher quality metric Qobj. Similarly, specific tiles can have a predetermined maximum quality level, and their final tile quality level Q cannot rise above this level no matter the quality metric of the object rendered.

The pixel processor 440 receives the pixel parameter xy from the scan converter 430 and the tile quality level Q from the tile quality processor 445. In at least one embodiment of the present invention, the pixel processor 440 computes display parameters for the pixel represented by the pixel parameter xy; these parameters depend on the tile quality level Q of the associated tile region represented by the tile parameter XY. Finally, at least one display parameter determines whether, and to what extent, anti-aliasing is performed on the pixel represented by the pixel parameter xy. The pixel processor 440 uses the frame buffer 450 to perform an anti-aliasing operation on the pixel according to the display parameters.

In another embodiment, the pixel processor separately determines whether and to what extent to perform anti-aliasing operations on the pixel; this anti-aliasing decision depends on the tile quality level Q. After making the anti-aliasing determination the pixel processor 440 uses the frame buffer 450 to perform an anti-aliasing operation on the pixel if necessary.

Preferably, pixels associated with tiles of a quality level that does not warrant anti-aliasing are passed to parallel pixel processors, or pipelines within the pixel processor 440, that do not perform anti-aliasing.

Figure 4B:
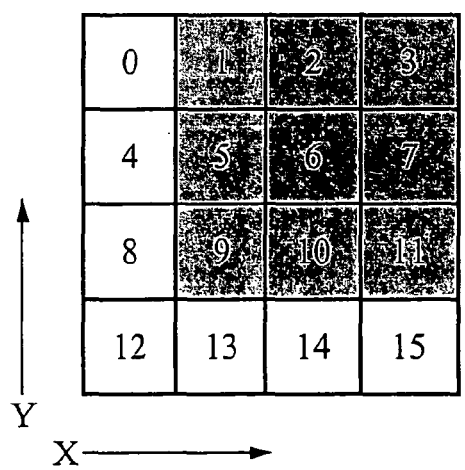
FIG. 4B is a schematic diagram of a tiled display area in accordance with one embodiment of the present invention.

FIGS. 4B and 4C illustrate exemplary embodiments of tile regions on the display and a corresponding tile quality metric table. In the display of FIG. 4B, darker shading represents higher levels of anti-aliasing. In the tile quality capability table of FIG. 4C, higher numbers represent higher quality capabilities. The display of FIG. 4B shows each tile rendered to its full quality capability. As shown, the regions 2, 3, 6, and 7 have quality level 2; the regions 1, 5, 9, 10, and 11 have quality level 1; and the regions 0, 4, 8, 12, 13, 14, and 15 have quality level 0. Correspondingly, the regions 2, 3, 6, and 7 are rendered with a first quality level; the regions 1, 5, 9, 10, and 11 are rendered with a second quality level that is lower than the first; and the regions 0, 4, 8, 12, 13, 14, and 15 are rendered with a third quality level that is lower than the first and the second. For example, the third quality level could represent no anti-aliasing at all, the second quality level could represent 4× supersampling, and the first quality level could represent 8× supersampling.

A few simple calculations illustrate the advantages provided by this type of configuration, given the right type of data to display. As a rough measure of computing resource use, represent each tile in this 16×16 grid by value 1 resource unit, apply the supersampling multiplier to each and consider total computing resources use proportional to the sum of all multiplied tiles. On this scale, the exemplary configuration uses 50 units, whereas a 16×16 grid rendered at 4× supersampling would use 64 units and a similar grid rendered at 8× supersampling would use 128 units. Thus, in a situation where nearly all important visual information is confined to the nine tiles in the upper right, a greater rendering quality is achieved for fewer resources. Of course, this analysis neglects the added resources necessary to ensure proper addressing of the buffer memory required to accomplish anti-aliasing.

The tile arrangements and quality level table shown in FIGS. 4A and 4B are exemplary only. The present invention expressly contemplates other tile arrangements and quality level tables, including a wide variety of quality levels and representations thereof. For example, tiles addressed within the present invention need not be square or rectangular but could have some other shape.

Graphics Process Unit

Figure 5:
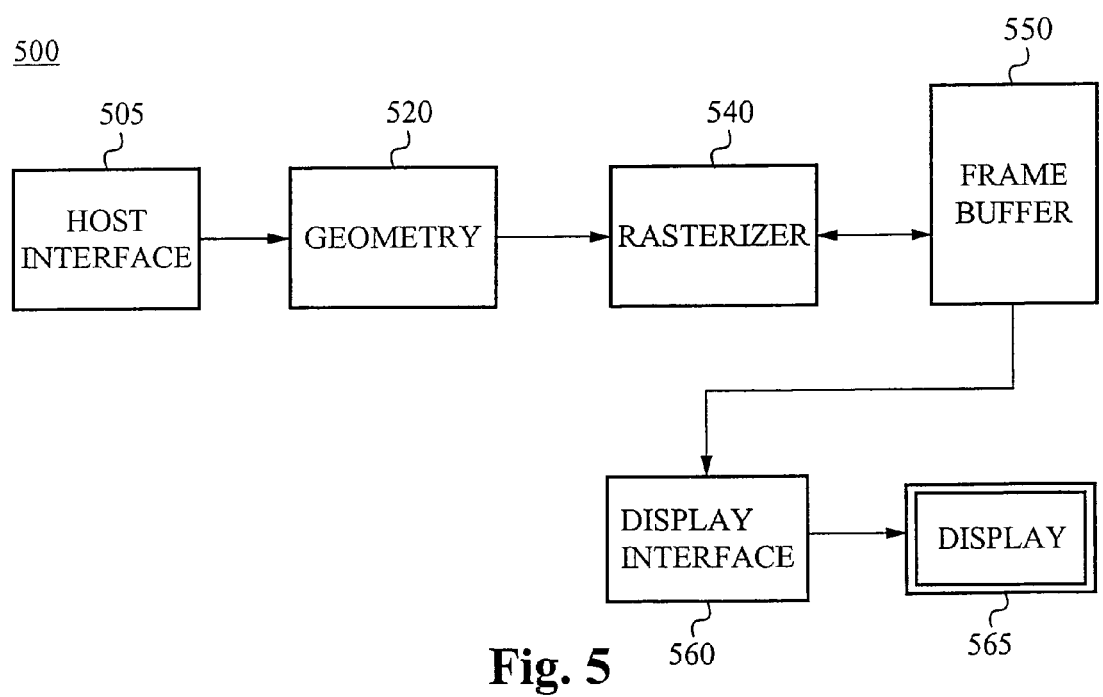
FIG. 5 is a block diagram of a graphics processing unit in accordance with an embodiment of the present invention.

The present invention can be implemented in a graphics processing unit (GPU), such as the GPU 500 shown in FIG. 5. The GPU comprises a host interface 505, coupled with a geometry device 520, which is in turn coupled with a rasterizer device 540. The rasterizer device 540 is coupled with the frame buffer 550, which is coupled to the display interface 560.

The host interface 505 receives data and conveys it to the geometry device 520, which uses the data to form primitives, and to assign a quality level to each primitive. In this embodiment, each primitive comprises a plurality of vertices. Each vertex of a primitive is associated with the quality level of that primitive. In some embodiments, the geometry device 520 also generates lighting data for each vertex.

The vertices, their associated quality metrics, and any lighting data are sent to the rasterizer device 540, which generates fragments, each comprising a plurality of pixels, based on the primitive, the lighting data, and the quality level of the primitive. Each fragment generated is assigned a quality level based at least in part on the quality metric of the primitive upon which it is based. Preferably, the fragments generated within the rasterizer device 540 are sufficient to render the primitive. In some embodiments, the primitive is rendered consistent with the OpenGL Specification (available online at http://www.opengl.org/).

The rasterizer device 540 is coupled with the frame buffer 550, which is configured to assist the rasterizer device 540 in performing anti-aliasing on the fragment. According to the present invention, anti-aliasing perfornmed on the fragments varies according to the fragment quality level.

Preferably, the rasterizer device 540 performs anti-aliasing by writing to and reading from the frame buffer device 550. The frame buffer device 550 is also coupled with the display interface 560, which receives pixels and sends them to the monitor 565 for display. In some embodiments, the display interface 560 provides some formatting of the pixels before sending it to the monitor 565.

Preferably buffering, such as FIFOs, is provided in the geometry device 520 and the rasterizer device 540 to help ensure that the GPU 500 operates at full capacity. In addition, one or more of the geometry device 510, the rasterizer device 540, the frame buffer 550, and the display interface 560, include multiple parallel pipelined stages, and appropriate sorting stages, for faster processing of data.

Memory Requirements

Systems according to the present invention can operate with reduced memory for anti-aliasing, e.g. multisample buffers, A-buffers, relative to full-scene anti-aliasing (FSAA) since only a portion of the scene is enhanced. In some embodiments, this can result in some additional complexity in addressing the memory.

For example, allocation of the frame buffer can be separated into two pieces: a full size base allocation for the default, low-quality representation of a scene, and a smaller size supplemental allocation. In some embodiments, the supplemental allocation can be aligned with selected locations of the base allocation. Preferably, in these embodiments a pixel processing unit uses a boundary test to determine which filtering algorithm to use for pixels near the edges of the selected locations.

In other embodiments, several small supplemental buffers can be allocated out of a larger pool of memory, which allows for more flexible enhancement implementations. In these embodiments, a pixel processing unit preferably uses a lookup table (LUT), content addressable memory (CAM), or some other suitable high-speed searching hardware to determine the address of the supplemental buffer to be used for each pixel or region of pixels.

Results

Figure 6:
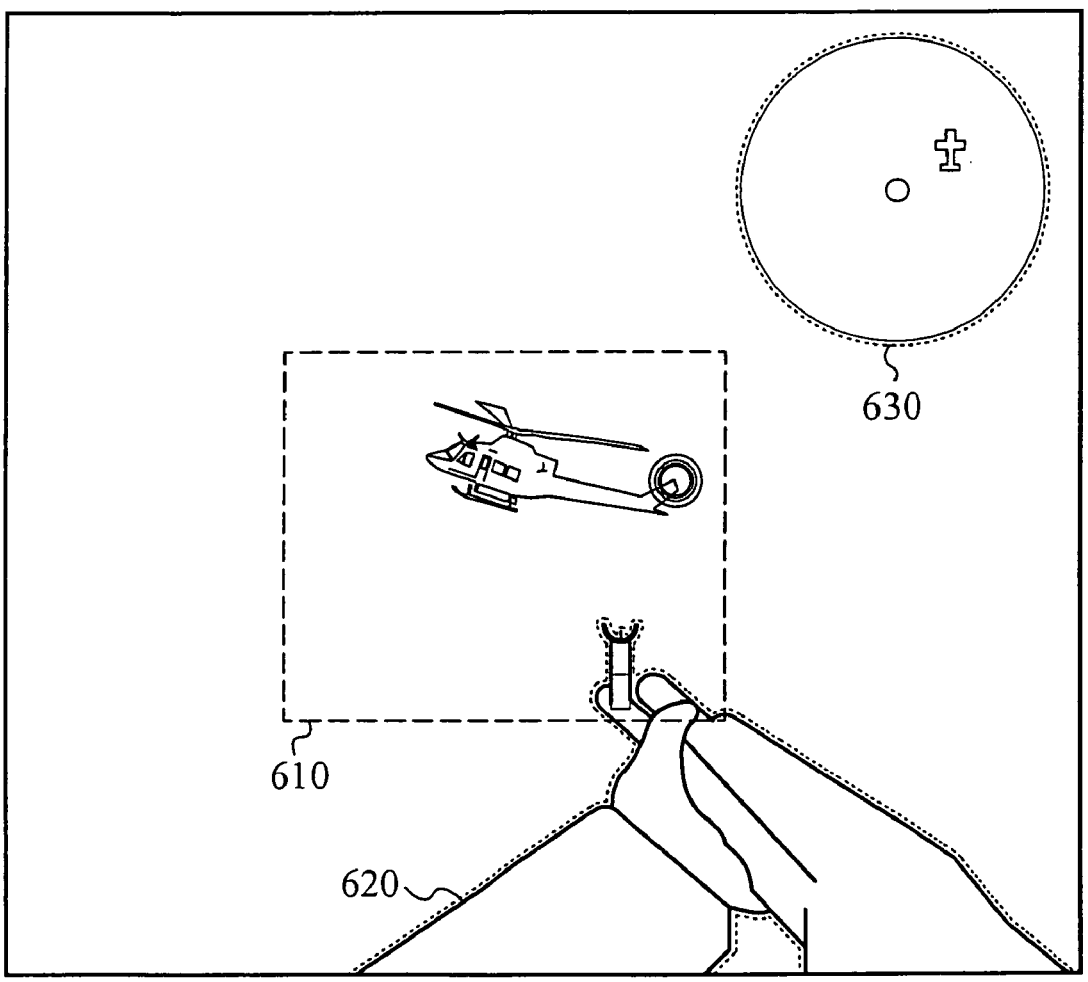
FIG. 6 is a diagram representing a screen shot generated in accordance with one embodiment of the present invention.

FIG. 6 illustrates an exemplary scene 600 from an imaginary video game rendered using a method embodied by the present invention. In this example, the region 610 denotes a display region predetermined for high-quality anti-aliasing. The radar object 630 and the first-person object 620 are also selected for high-quality anti-aliasing. Though in this case the quality levels of anti-aliasing across the various objects and the display region are the same, in some embodiments different regions or objects can have different quality levels.

In the present invention the objects and regions selected that receive high-quality anti-aliasing are preferably chosen by the application programmer, as is the case in the scene 600. For example, the application programmer could have specified that all objects that are more than 60% within a region 610 centered on the display receive high-quality anti-aliasing, and that the radar object 630 and the first-person object 620 always receive high-quality anti-aliasing. Note that if the radar object 630 is always fixed on the display, this could be equivalent to specifying constant anti-aliasing of the region in which it is always fixed. However, in a more likely scenario, the application programmer could permit the user to configure the location, size, shape, configuration, etc. of a radar object, and the radar object 630 is only one of many possible configurations. In this case, specifying the anti-aliasing quality level of the object, instead of the screen location, is a more robust and flexible option.

Under the above scheme, if an object such as an image of a helicopter moves so that less than 60% of it is within the region 610, then it will no longer receive high-quality anti-aliasing. Hence, with each frame, a test must be performed to determine which objects qualify for high-quality based on interactions with region 610. In another embodiment, the helicopter itself could have a predetermined level of anti-aliasing quality, either greater and or less than that of the region 610. An alternative choice is to gradually decrease the anti-aliasing outside the boundary of the region. In comparison, the object quality level specification of the radar object 630 and the first person object 620 requires no testing of other objects to determine effects. However, boundary behavior will still need to be specified.

The present invention has been described in terms of specific embodiments incorporating details to facilitate the understanding of the principles and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

We claim:

1. A method implemented by a system for processing data that includes a plurality of primitives for display, comprising:
    a) determining, by the system, an object quality metric for a primitive;
    b) converting, by the system, the primitive into at least one fragment and associating each fragment with a pixel and an associated tile region of a display;
    c) determining, by the system, a tile quality level for the associated tile region based on both the object quality metric and a tile quality level capability;
    d) performing, by the system, a first anti-aliasing operation on the fragment, wherein the first anti-aliasing operation has a quality level based on the tile quality level, and wherein each fragment may be associated with different tile regions over a period of time such that the quality level of anti-aliasing performed on a given fragment may change as the fragment becomes associated with the different tile regions; and
    e) computing, by the system, one or more display parameters for the pixel.

2. The method of claim 1, further comprising repeating steps (c) and (d) for each fragment into which the primitive is converted.

3. The method of claim 1, wherein the first anti-aliasing operation is a null operation.

4. The method of claim 1, further comprising storing the fragment and the one or more display parameters in a frame buffer.

5. The method of claim 1, wherein the anti-aliasing operation includes one or more of the following: multi-sampling, A-buffering, area sampling, point sampling, sub-pixel rendering, over-sampling, mipmapping, ripmapping, summed area table filtering, and unconstrained anisotropic filtering.

6. A system for processing data that includes a plurality of primitives for display, the system comprising:
    a) a primitive processor configured to receive a primitive and associate it with an object quality metric;
    b) a scan converter configured to receive the primitive and the object quality metric from the primitive processor, to convert the primitive into at least one fragment, and to associate a first fragment with a first pixel and a first tile region;
    c) a tile quality processor configured to receive the object quality metric and a first tile parameter representing the first tile region from the scan converter, and to determine a first tile quality level for the first tile region based on both the object quality metric and a tile quality capability; and
    d) a fragment processor configured to receive the first fragment from the scan converter and to receive the first tile quality level from the tile quality processor, and to perform a first anti-aliasing operation on the fragment, wherein the first anti-aliasing operation has a quality level based on the first tile quality level, and wherein the fragment may be associated with different tile regions over a period of time such that the quality level of anti-aliasing performed on the fragment may change as the fragment becomes associated with the different tile regions;
    wherein at least one of:
        (i) the object quality metric, and
        (ii) the first tile quality level,
    is predetermined through an application programming interface.

7. The system of claim 6, the first anti-aliasing operation is a null operation.

8. The system of claim 6, wherein the fragment processor stores the fragment and the display parameter in a frame buffer.

9. The system of claim 6, wherein the anti-aliasing performed includes one or more of the following: multi-sampling, A-buffering, area sampling, point sampling, sub-pixel rendering, over-sampling, mipmapping, ripmapping, summed area table filtering, and unconstrained anisotropic filtering.

10. A graphics processing unit, comprising:
    a) a host interface configured to receive data from a host device;
    b) a geometry device configured to receive data from the host interface, to use the data to form a plurality of primitives, and to assign a quality metric to each primitive and send the quality metric for each primitive to a rasterizer device;
    c) the rasterizer device configured to receive a first primitive from the geometry device and the sent quality metric for each primitive, to generate at least one fragment, comprising a plurality of pixels, based on the first primitive, to assign each fragment a fragment quality level based at least in part on the quality metric of the first primitive, and to perform a first anti-aliasing operation on each fragment, wherein the first anti-aliasing operation has a quality level based on the fragment quality level;
    d) a frame buffer device configured to assist the rasterizer device in performing anti-aliasing operations; and
    e) a display interface configured to receive the pixels of each fragment anti-aliased by the rasterizer device and to send the pixels to a display.

11. The graphics processing unit of claim 10, wherein the frame buffer includes a full size base memory allocation and a small supplemental memory allocation for anti-aliasing operations.

12. The graphics processing unit of claim 10, wherein the frame buffer includes a full size base memory allocation and several small supplemental memory allocations for anti-aliasing operations.

13. The graphics processing unit of claim 10, wherein the rasterizer device is configured to perform a null anti-aliasing operation for certain fragment quality levels.

14. The graphics processing unit of claim 10, wherein the rasterizer device is configured to process all the fragments generated from the first primitive in the same manner as the first fragment.

15. The graphics processing unit of claim 10, wherein the anti-aliasing performed includes one or more of the following: multi-sampling, A-buffering, area sampling, point sampling, sub-pixel rendering, over-sampling, mipmapping, ripmapping, summed area table filtering, and unconstrained anisotropic filtering.

16. The graphics processing unit of claim 10, wherein the display interface receives pixels from the rasterizer device through the frame buffer device.

17. A method of displaying a view of a changing scene on a display, comprising:
   a) dividing the view into a group of regions;
   b) assigning a first subgroup of regions a first quality capability;
   c) assigning a second subgroup of regions a second quality capability;
   d) assigning an object quality metric to an object; and
   e) performing a display operation that includes:
      i) associating the object with one or more object-associated regions;
      ii) assigning a first quality level to any object-associated region within the first subgroup, wherein the first quality level is based on both the object quality metric and the first quality capability;
      iii) performing a first anti-aliasing operation in every object-associated region with the first quality level, wherein each object may be associated with different object-associated regions over a period of time such that the quality level of anti-aliasing performed on a given object may change as the object becomes associated with the different object-associated regions; and
      iv) displaying the view;
   wherein the division of the view into the group of regions is predetermined through an application programming interface, and wherein at least one of:
      i) assignment of the first subgroup of regions and selection of the first quality capability, and
      ii) assignment of the second subgroup of regions a second quality capability, and
      iii) assignment of the object quality metric,
   is predetermined through an application programming interface.

18. The method of claim 17, further comprising repeating step (e) wherein the quality level in at least one object-associated region changes.

19. The method of claim 17, wherein the regions comprise sub-regions, and each object-associated region comprises at least one object-associated sub-region and the first anti-aliasing operation is performed only in the object-associated sub-region of each object-associated region.

* * * * *